United States Patent [19]
Sano et al.

[11] Patent Number: 5,047,439
[45] Date of Patent: Sep. 10, 1991

[54] EXPANDABLE POWDER COATING COMPOSITION, METHOD OF COATING A SUBSTRATE WITH HEAT-INSULATING FOAM AND COMPOSITE MATERIAL OBTAINED THEREBY

[75] Inventors: Katuya Sano, Chiryu; Takeshi Hasegawa, Nagoya; Kiyoshi Kittaka, Okazaki; Atushi Sakuraoka, Toyohashi; Katsuji Kitagawa, Kasukabe; Tetsuo Miyake, Kitakatsushika; Kazutomo Moriguchi, Soka, all of Japan

[73] Assignee: Somar Corporation, Japan

[21] Appl. No.: 279,057

[22] Filed: Dec. 2, 1988

[30] Foreign Application Priority Data

| Dec. 3, 1987 | [JP] | Japan | 62-307108 |
| Mar. 15, 1988 | [JP] | Japan | 63-060845 |
| Aug. 3, 1988 | [JP] | Japan | 63-193632 |
| Aug. 3, 1988 | [JP] | Japan | 63-193633 |

[51] Int. Cl.$^5$ .............................................. C08J 9/06
[52] U.S. Cl. ........................................ 521/78; 521/94; 521/141; 521/155; 521/161; 521/170; 427/44; 427/195
[58] Field of Search .................. 521/78, 94, 141, 155, 521/161, 170; 427/44, 195; 525/61

[56] References Cited

U.S. PATENT DOCUMENTS

| 3,632,532 | 1/1972 | Gaeth et al. | 521/94 |
| 3,993,849 | 11/1976 | Victorius | 427/195 |
| 4,246,380 | 1/1981 | Gras et al. | 427/195 |
| 4,514,546 | 4/1985 | Resz et al. | 427/195 |

OTHER PUBLICATIONS

Organic Chemistry–Feiser & Feiser pp. 914–916, 1944 edition.
Textbook of Polymer Science–Fred W. Billmeyer, Jr. pp. 4, 406–410 (1966).

Primary Examiner—Veronica P. Hoke
Attorney, Agent, or Firm—Lorusso & Loud

[57] ABSTRACT

An expandable, powder coating composition is disclosed which comprises (a) a thermoplastic resin containing a hydroxyl group-containing polymer, (b) a cross-linking agent containing a polyisocyanate compound which is capable of reacting with the hydroxyl groups of the polymer to crosslink the polymer at a temperature higher than the melting point of the thermoplastic resin and which is solid at room temperature, and (c) a blowing agent capable of decomposing and generating a gas when heated to a temperature higher than the melting point of the thermoplastic resin. Powder coating with the coating composition can give a heat-insulating, foamed sheath or lining over the surface of a metal tube or box to be used in air conditioners.

26 Claims, No Drawings

EXPANDABLE POWDER COATING COMPOSITION, METHOD OF COATING A SUBSTRATE WITH HEAT-INSULATING FOAM AND COMPOSITE MATERIAL OBTAINED THEREBY

This invention relates to an expandable, powder coating composition and to a method of forming a heat-insulating, foamed resin coat over the surface of a substrate such as a metal tube or a box. The present invention is also directed to a composite material obtained by the above method.

Metal tubes of air conditioners used in automobiles, electric cars, buildings, etc. are generally provided with heat-insulating sheaths of foamed resins. Known foamed resin sheaths have been produced by extrusion or by molding in a mold cavity. The conventional methods, however, have problems because sheaths with various different shapes must be prepared so as to conform to various outer shapes of metal tubes, because it is difficult to mount the resulting sheaths on tubes with complicated shapes and because clearance between the sheath and the tube is unavoidable, thus causing a reduction in heat-insulating efficiency. These also apply to a heat-insulating lining of a container or box to be used, for example, for containing a heating or cooling medium.

With the foregoing problems of the conventional method in view, the present invention provides an expandable, powder coating composition useful for forming a foamed, heat-insulating layer over the surface of a substrate. In accordance with the present invention there is provided an expandable, powder coating composition comprising:

(a) a thermoplastic resin containing a hydroxyl group-containing polymer;

(b) a cross-linking agent containing a polyisocyanate compound which is capable of reacting with the hydroxyl groups of said polymer at a temperature higher than the melting point of said thermoplastic resin to crosslink said polymer and which is solid at room temperature; and (c) a blowing agent capable of decomposing and generating a gas when heated to a temperature higher than the melting point of said thermoplastic resin.

In another aspect the present invention provides a method of coating a substrate with a layer of an expanded resin, comprising the steps of:

powder coating the substrate with the above coating composition at a temperature sufficient to decomposing said blowing agent and to cause said coating composition to expand, thereby to form a layer of the expanded resin over the surface of the substrate.

The present invention also provides a composite material obtained by the above method.

There is known an expandable resin composition which includes a polyolefin resin, a cross-linking agent and a blowing agent. Such a composition has been used for forming foamed articles such as foamed sheets and is not intended to be used as a coating composition. Also known is an expandable powder coating composition including an epoxy resin. Such a powder coating composition is, however, utilized for vibration isolation or sound-proofing. When utilized for heat-insulation of a substrate such as a metal tube or a box, the epoxy resin-type coating composition poses the following problems:

(1) Uniform and fine cells are not obtainable;

(2) The foamed coat layer lacks cushioning property (elasticity) or flexibility and tends to cause cracking or peeling from the substrate. When used in conjunction with a filler or a reinforcing material, the fluidity of the composition becomes poor;

(3) Thermal conductivity is relatively high and heat-insulating efficiency is not high;

(4) The foamed coat layer is not closely contacted with the substrate.

In contrast, the coating composition according to the present invention gives a foamed coat which is closely contacted with the surface of the substrate, which has excellent heat-insulating property, cushioning property, heat resistance, surface hardness and surface slippage.

The present invention will now be described in detail below.

The thermoplastic resin which serves, upon expansion, as a structural material is a hydroxyl group-containing polymer or a mixed polymer containing same. Examples of suitable hydroxyl group-containing polymer include polyvinyl alcohols, partially saponified ethylene/vinyl acetate copolymers and polyvinyl butyral resins. Such polymers preferably have a weight average molecular weight of about 10,000–100,000, more preferably about 35,000–80,000.

For the purpose of improving bonding of a foamed layer obtained from the coating composition to a substrate, it is preferred that the hydroxyl group-containing polymer further contain carboxyl groups. Such a polymer containing both hydroxyl and carboxyl groups can be obtained by conducting the polymerization for the production of the above hydroxyl group-containing polymer in the presence of an unsaturated carboxylic acid, such as maleic anhydride, acrylic acid, methacrylic acid or itaconic acid. Alternatively, grafting of such an unsaturated carboxylic acid onto the above hydroxyl group-containing polymer can give a polymer containing both hydroxyl and carboxyl groups.

The thermoplastic resin may further contain a hydroxyl group-free polymer such as a polyolefin, an ethylene/vinyl acetate copolymer, a polyvinyl chloride or an ethylene/ethyl acrylate copolymer. Examples of suitable polyolefins include polyethylenes, ethylene/-propylene copolymers, polypropylenes and polybutene-1. When such a hydroxyl group-free polymer is used, the amount of the hydroxyl group-containing polymer in the thermoplastic resin is generally 50% by weight or more, preferably 60% by weight or more.

The thermoplastic resin is preferably used in conjunction with a viscosity controlling agent which can control the viscosity of the coating composition in a molten state to facilitate the exapansion thereof. A polyol compound which is solid or semi-solid at room temperature is preferably used as the viscosity controlling agent.

Illustrative of suitable polyol compounds are: ether-containing diols having the following general formula (I):

wherein m is a positive integer, preferably of 2-6, more preferably 3-4 and n is an integer of at least 2, preferably 4-6, ester-containing diols having the following general formula (II):

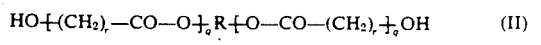

wherein R stands for an alkylene having 2-10 carbon atoms, q is an integer of 1 or more, preferably 3-4, and r is an integer of 1 or more, preferably 3-7, and polymers having a saturated hydrocarbon skeleton and a molecular weight of 1000-5000 and containing 1.5-3 terminal hydroxyl groups. The polyol compound is used in an amount of 5-100 parts by weight, preferably 20-60 parts by weight per 100 parts by weight of the thermoplastic resin. The molecular weight of the polyol compound is generally about 300-6,000, preferably about 2,000-5,000.

Any polyisocyanate compound which is solid at room temperature and which has two or more isocyanate groups may be used as the cross-linking agent in the coating composition of the present invention. Examples of the polyisocyanate compounds include phenylenediisocyanate, tolylenediisocyanate, biphenylenediisocyanate and diphenylmethane-p,p-diisocyanate. Blocked polyisocyante compounds having their isocyanate groups blocked with an active hydrogen-containing compound such as an amide, a lactam, phenol, an alcohol, an oxyme or a mercaptane can also be suitably used for the purpose of the present invention. ε-Caprolactam is a particularly preferred active hydrogen-containing compound. For example, a compound having the formula (I):

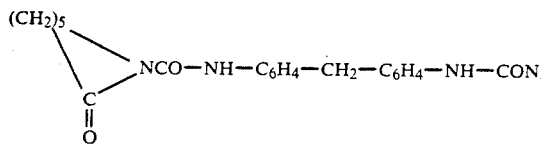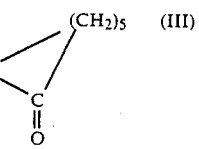

may be suitably used as the cross-linking agent.

The polyisocyante compound or its blocked derivative can react with the hydroxyl groups of the hydroxyl group-containing polymer to cross-link same. It can also react with the polyol compound which is optionally contained in the coating composition to form high molecular weight compounds. The polyisocyanate compound is used in an amount providing a ratio (NCO/OH) of equivalents of the isocyanate group per equivalent of the hydroxyl group in the composition of less than 1, preferably 0.03-0.8.

The cross-linking agent may further contain an organic peroxide in an amount of 0.5-7.0 parts by weight, preferably 1.0-4.0 parts by weight per 100 parts by weight of the thermoplastic resin. The organic peroxide may be, for example, dicumyl peroxide, bis(t-butylperoxy)isopropylbenzene, dimethyldi(t-butylperoxy)hexane or dimethyldi(t-butylperoxy)hexyne.

The blowing agent may be an organic one such as azodicarbonamide, 2,2'-azobisisobutyronitrile, dinitrosopentamethylenetetramine, 4,4'-oxybisbenzene-sulfonyl hydrazide or paratoluenesulfonyl hydrazide, or an inorganic one such as sodium bicarbonate, ammonium carbonate, sodium borohydride or silicon oxyhydride. These blowing agents may be used by themselves or as a mixture of two or more. When the blowing agent used has a high decomposition temperature, the use of an expansion aid such as zinc oxide is effective in lowering the decomposition temperature. In the coating composition of the present invention, it is desirable to use several kinds of crosslinking agents together with an expansion aid for reasons of broadening the temperature range in which the composition is able to be expanded and of permitting the expansion to proceed uniformly even when the temperature at which the expansion is performed fluctuates.

The coating composition may further contain various additives such as a filler, a plasticizer, a coloring agent, a free flow improving agent and an antioxidant.

As the fillers, both organic and inorganic ones may be used. The viscosity of the coating composition in a molten state, and the diameter of cells and the mechanical strength of an expanded body obtained from the coating composition may be controlled by controlling the amount and the particle size of the filler to be added.

Illustrative of suitable plasticizers are chlorinated paraffins, dioctylphthalate, diethylene glycol dibenzoate and dicyclohexylphthalate. Other customarily employed plasticizers may also be used. These plasticizers can impart desired cushioning property (elasticity) and flexibility to the coatings obtained from the coating composition.

The coating composition may be obtained by mixing and kneading the above components with each other at a temperature higher than the melting point of the resin, pelleticizing the kneaded mixture, and grinding the pellets. In order to prevent the occurrance of expansion during the mixing stage, a mixing temperature of less than the decomposition temperature of the blowing agent is adopted. Further, the mixing is desired to be carried out at a temperature lower than the temperature at which the cross-linking occurs so that the occurrence of cross-linking is substantially prevented.

The coating composition preferably has such a particle size distribution that the content of particles with a particle size of 40 mesh (Tyler) or finer is 100% by weight, the content of particles with a particle size of 200 mesh or finer is at least 50% by weight and the content of particles with a particle size of 325 mesh or finer is not greater than 50% by weight, for the purpose of improving the free flow property of the coating composition and thereby facilitating the deposition of the coating composition onto a substrate during the powder coating stage.

Coating of a substrate with the coating composition is carried out in a manner known per se at a temperature sufficient to decompose the blowing agent, to cross-link the resin and to cause said coating composition to expand, thereby to form a layer of the expanded resin over the surface of the substrate. The powder coating may, for example, be carried out by contacting a substrate preheated to a temperature higher than the decomposition temperature of the blowing agent with a fluidized mass of the coating composition. By this, the powder of the coating composition deposits on the surface of the substrate and the deposits are melted and undergo both cross-linking and expansion, thereby forming a foamed layer.

As the substrate, there may be suitably used a pipe or a container or a box formed of a metal such as aluminum or an aluminum-containing alloy or a synthetic resin such as a polyethylene resin, a polypropylene resin or a polybutylenephthalate. In the case of a box, the coated layer may be provided on the outer and/or inside surfaces thereof.

The expansion ratio of the foamed layer may be controlled by the amount of the blowing agent in the coating composition and is preferably 2-20, more preferably 3-10. The thickness of the foamed layer is generally 1-15 mm, preferably 2-8 mm.

When a metal tube is used as the substrate, there may be obtained a thermally insulated, sheathed tube to be used, for example, for connection to respective parts of air conditioners, such as compressors, condensers, expanders and evaporators, through which a cooling or heating medium is passed. When a box is used as the substrate, there may be obtained a thermally insulated box to be used, for example, for containing a cooling or heating medium of a car air conditioner or for accommodating a cooling unit and an evaporator (heat-exchanger) of a car air conditioner.

The following examples will further illustrate the present invention.

EXAMPLE 1

To 100 parts by weight of a partially saponified ethylene/vinyl acetate copolymer (saponification degree: 80%) were mixed 30 parts by weight of calcium carbonate as a filler, 5 parts by weight of azodicarbonamide as a blowing agent, a blend of another 5 parts by weight of azodicarbonamide and 3 parts by weight of zinc oxide as an expansion aid, 7.1 parts by weight (NCO/OH equivalent ratio: 0.1) of a blocked isocyanate having the formula (III) and 1.7 parts by weight of dicumylperoxide both as a cross-linking agent, and 0.5 part by weight of carbon black as a coloring agent. The thus obtained mixture was mixed in a wet state and then extruded at a temperature of 120° C. with an extruder. The extrudate was pelletized and ground. The ground powder was then mixed in a dry state with 0.15% by weight of finely divided colloidal silica (Trademark: AEROSIL 300) as a free-flow improving agent to obtain a coating composition in the form of fine powder.

EXAMPLE 2

Example 1 was repeated in the same manner as described except that the amount of the filler (calcium carbonate) was increased to 100 parts by weight.

EXAMPLE 3

Example 1 was repeated in the same manner as described except that the dicumylperoxide was omitted and the blocked isocyanate was used by itself.

EXAMPLE 4

To 100 parts by weight of a partially saponified ethylene/vinyl acetate copolymer as used in Example 1 were added 50 parts by weight of a polyester polyol of the formula (II) (R: pentamethylene, r: 5, q: 4), 10 parts by weight of a polytetramethylene ether glycol of the formula (I) (m: 4, n: 5), 150 parts by weight of calcium carbonate, 5 parts by weight of azodicarbonamide, a blend of another 5 parts by weight of azodicarbonamide and 2.5 parts by weight of zinc oxide, 100 parts by weight (NCO/OH equivalent ratio: 0.8) of a blocked isocyanate having the formula (III), 3.4 parts by weight of dicumylperoxide, 0.5 part by weight of dibutylene dilaurate as a curing accelerating agent and 0.5 part by weight of carbon black. The resulting mixture was extruded, pelletized, ground and mixed with colloidal silica in the same manner as that in Example 1 to obtain a coating composition in the form of fine powder.

EXAMPLE 5

Example 4 was repeated in the same manner as described except that 30 parts by weight of a chlorinated paraffin (commercially available as #70NS) were additionally incorporated into the coating composition.

EXAMPLE 6

Using the powder coating composition obtained in Example 1, an aluminum tube (diameter: 20 mm, length: 200 mm) and an aluminum box (300×300×300 mm) both heated to 200° C. were subjected to powder coating and expansion. The foamed layers were found to be closely contacted with the aluminum surfaces and to have an expansion ratio of 3-5 and fine and uniform cells. The layers also had a good cushioning property (elasticity).

EXAMPLE 7

Example 6 was repeated in the same manner as described using the coating composition obtained in Example 2. Elastic foamed layers having an expansion ratio of 4-6 and fine, uniform cells were obtained.

EXAMPLE 8

Example 6 was repeated in the same manner as described using the coating composition obtained in Example 3. Foamed layers having an expansion ratio of 5-6 and fine, uniform cells were obtained. The foamed layers had slightly decreased cushioning property and flexibility as compared with those of Example 5, but had a finer cellular structure and an improved surface hardness.

EXAMPLE 9

Example 6 was repeated in the same manner as described using the coating composition obtained in Example 4. Elastic foamed layers having an expansion ratio of 4-5 and fine, uniform cells were obtained.

EXAMPLE 10

Example 6 was repeated in the same manner as described using the coating composition obtained in Example 5. Foamed layers having fine, uniform cells were obtained. The cushioning property and flexibility of the foamed layers were superior as compared with those of Example 9.

The sheathed tubes and externally lined boxes obtained in Examples 6-10 had an excellent heat-insulating property.

COMPARATIVE EXAMPLE 1

Example 1 was repeated in the same manner as described except that the blocked isocyanate compound was not used at all. Foamed layer obtained using the resulting coating composition in the same manner as that in Example 6 had the following defects: (1) Some cells were broken during expansion and the foamed layer had not a uniform cellular structure. (2) The cells were weak in strength and easily broken. (3) The surface of the foamed layer was not smooth nor slippery. (4) The foamed layer lacked elasticity or cushioning property.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. An expandable, hydroxyl group-containing powder coating composition comprising:
   (a) a thermoplastic resin containing a hydroxyl group-containing polymer;
   (b) a cross-linking agent containing a polyisocyanate compound which is capable of reacting with the hydroxyl groups of said polymer at a temperature higher than the melting point of said thermoplastic resin to crosslink said polymer and which is solid at room temperature, the relative amounts of hydroxyl groups in the composition and said polyisocyanate compound providing a ratio of equivalents of the isocyanate group per equivalent of the hydroxyl groups in the composition of less than 1; and
   (c) a blowing agent capable of decomposing and generating a gas when heated to a temperature higher than the melting point of said thermoplastic resin.

2. A composition as claimed in claim 1, wherein said hydroxyl group-containing polymer is selected from polyvinyl alcohols, partially saponified ethylene/vinyl acetate copolymers and polyvinyl butyral resins.

3. A composition as claimed in claim 1, wherein said hydroxyl group-containing polymer further contains carboxyl groups.

4. A composition as claimed in claim 1, wherein said thermoplastic resin further contains a hydroxyl group-free polymer in an amount less than 50% by weight of said hydroxyl group-containing polymer.

5. A composition as claimed in claim 4, wherein said hydroxyl group-free polymer is selected from polyolefins, ethylene/vinyl acetate copolymers, polyvinyl chlorides and ethylene/ethyl acrylate copolymers.

6. A composition as claimed in claim 1, further comprising a polyol compound in an amount of 5–100% by weight of said thermoplastic resin.

7. A composition as claimed in claim 6, wherein said polyol compound is selected from ether-containing diols having the following general formula:

wherein m is a positive integer and n is an integer of at least 2,
ester-containing diols having the following general formula:

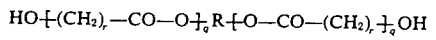

wherein R stands for an alkylene having 2–10 carbon atoms, q and r each stand for an integer of 1 or more, and
saturated hydrocarbons having 1.5–3 terminal hydroxyl groups and a molecular weight of 1000–5000.

8. A composition as claimed in claim 1, wherein said polyisocyanate compound is selected from phenylenediisocyanate, tolylenediisocyante, biphenylenediisocyanate and diphenylmethane-p,p-diisocyanate.

9. A composition as claimed in claim 1, wherein said polyisocyanate compound has its isocyanate groups blocked with an amide, a lactam, phenol, an alcohol, an oxime or a mercaptan.

10. A composition as claimed in claim 9, wherein said polyisocyanate compound is a compound having the formula:

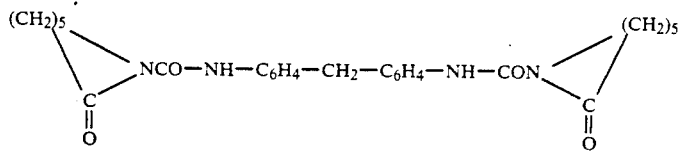

11. A composition as claimed in claim 1, wherein said cross-linking agent further contains an organic peroxide in an amount of 0.5–7 parts by weight per 100 parts by weight of said thermoplastic resin.

12. A composition as claimed in claim 11, wherein said organic peroxide is a member selected from the group consisting of dicumyl peroxide, bis(t-butylperoxy)isopropylbenzene, dimethyldi(t-butylperoxy)hexane and dimethyldi(t-butylperoxy)hexyne.

13. A composition as claimed in claim 1, wherein said blowing agent is at least one member selected from the group consisting of azodicarbonamide, 2,2'-azobisisobutyronitrile, dinitrosopentamethylenetetramine, 4,4'-oxybisbenzenesulfonyl hydrazide, paratoluenesulfonyl hydrazide, sodium bicarbonate, ammonium carbonate, sodium borohydride and silicon oxyhydride.

14. A composition as claimed in claim 1, wherein said blowing agent is contained in an amount so that said composition gives an expanded body having an expansion ratio of 2–20.

15. A composition as claimed in claim 1 and having such a particle size distribution that the content of particles with a particle size of 40 mesh or finer is 100% by weight, the content of particles with a particle size of 200 mesh or finer is at least 50% by weight and the content of particles with a particle size of 325 mesh or finer is not greater than 50% by weight.

16. A composition as claimed in claim 1, further comprising a plasticizer.

17. A composition as claimed in claim 1, wherein said plasticizer is selected from a chlorinated paraffin, dioctylphthalate, diethylene glycol dibenzoate and dicyclohexyl phthalate.

18. A composition in accordance with claim 1 wherein said hydroxyl group-containing polymer has a weight average molecular weight of about 10,000–100,000.

19. A composition in accordance with claim 1 wherein said hydroxyl group-containing polymer has a weight average molecular weight of about 35,000–80,000.

20. A method of coating a substrate with an expanded resin, comprising the steps of:
   providing an expandable, powder coating composition which comprises (a) a thermoplastic resin containing a hydroxyl group-containing polymer; (b) a cross-linking agent containing a polyisocyanate compound which is capable of reacting with the hydroxyl groups of said polymer at a temperature higher than the melting point of said thermoplastic resin and which is solid at room temperature; the relative amounts of hydroxyl groups in the composition and said polyisocyanate compound providing a ratio of equivalents of the isocyanate group per equivalent of the hydroxyl groups in the composition of less than 1; and (c) a blowing agent capable of decomposing and generating a gas when heated to a temperature higher than the melting point of said thermoplastic resin; and powder coating the substrate with said coating composition at a temperature sufficient to decompose said blowing agent and to cause said coating composition to expand, thereby to form a layer of the expanded resin over the surface of the substrate.

21. A composite material obtained by the method of claim 20.

22. A composite material as claimed in claim 21, wherein said layer has a thickness of about 1-15 mm.

23. A composite material as claimed in claim 21, wherein said substrate is a metal tube and said coated layer is a sheath surrounding said metal tube.

24. A composite material as claimed in claim 23, and being of a type which is used in an air conditioner for transporting a cooling or heating medium therethrough.

25. A composite material as claimed in claim 18, wherein said substrate is a container and said coated layer is provided on the outer and/or inside surfaces of said container.

26. A composite material as claimed in claim 23, and being of a type which is used in an air conditioner for containing a cooling or heating medium therein or for accommodating a heat exchanger therewith.

* * * * *

UNITED STATES PATENT AND TRADEMARK OFFICE
CERTIFICATE OF CORRECTION

PATENT NO. : 5,047,439

DATED : September 10, 1991

INVENTOR(S) : KITAGAWA et al

It is certified that error appears in the above-identified patent and that said Letters Patent is hereby corrected as shown below:

Col. 10, line 9, "18" should read --17--.

Signed and Sealed this

Second Day of March, 1993

Attest:

STEPHEN G. KUNIN

Attesting Officer

Acting Commissioner of Patents and Trademarks